United States Patent
Terry, Sr.

[11] Patent Number: 5,813,501
[45] Date of Patent: Sep. 29, 1998

[54] HAND OPERATED HYDRAULIC VEHICLE BRAKE

[76] Inventor: Maurice C. Terry, Sr., 13922 SE. 44th St., Bellevue, Wash. 98006

[21] Appl. No.: 733,965

[22] Filed: Oct. 18, 1996

[51] Int. Cl.[6] ............................................... B60T 11/00
[52] U.S. Cl. ..................... 188/344; 188/24.11; 188/24.22
[58] Field of Search ................................ 188/344, 24.11, 188/24.12, 24.19, 24.22; 303/9.64

[56] References Cited

U.S. PATENT DOCUMENTS

| | | | |
|---|---|---|---|
| 3,776,333 | 12/1973 | Mathuser | 188/344 |
| 4,391,353 | 7/1983 | Mathuser | 188/344 X |
| 4,441,592 | 4/1984 | Everett | 188/24.12 X |
| 4,615,415 | 10/1986 | Mathuser | 188/344 X |
| 5,168,962 | 12/1992 | Yoshigai | 188/24.12 X |

*Primary Examiner*—Robert J. Oberleitner
*Assistant Examiner*—Pamela J. Lipka
*Attorney, Agent, or Firm*—Leonard J. Santisi

[57] ABSTRACT

A hand operated hydraulic brake system includes a manual, lever operated master cylinder control which transfers hydraulic pressure from the master control to one or more hydraulic slave actuating cylinders. The system transfers force through the use of rolling diaphragms in a completely sealed hydraulic containment system. Actuated by the lever, the applied force is transmitted through a hydraulic line, or lines against piston rams to force brake pads against a rim, disk or other braking surface of a wheel.

8 Claims, 5 Drawing Sheets

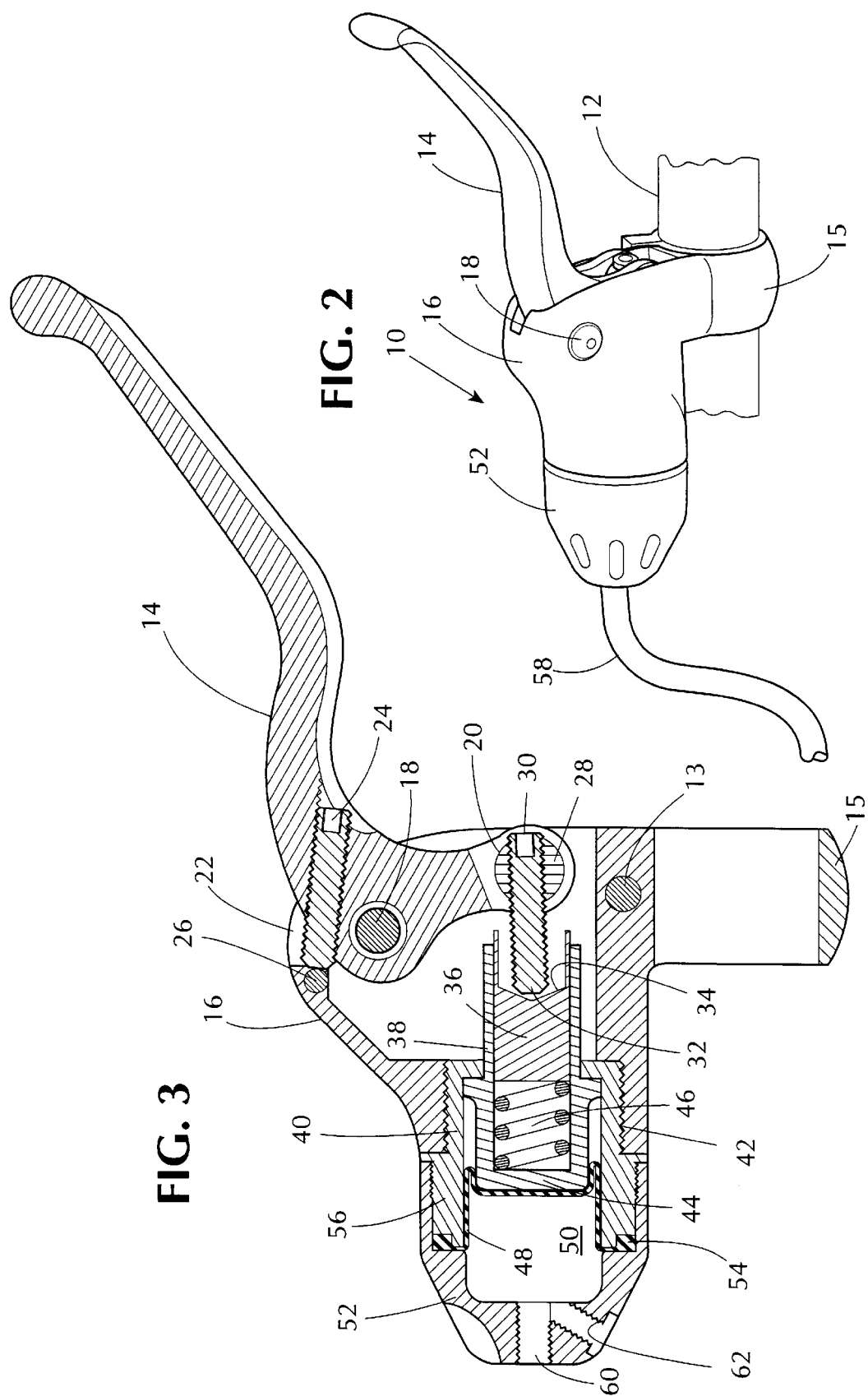

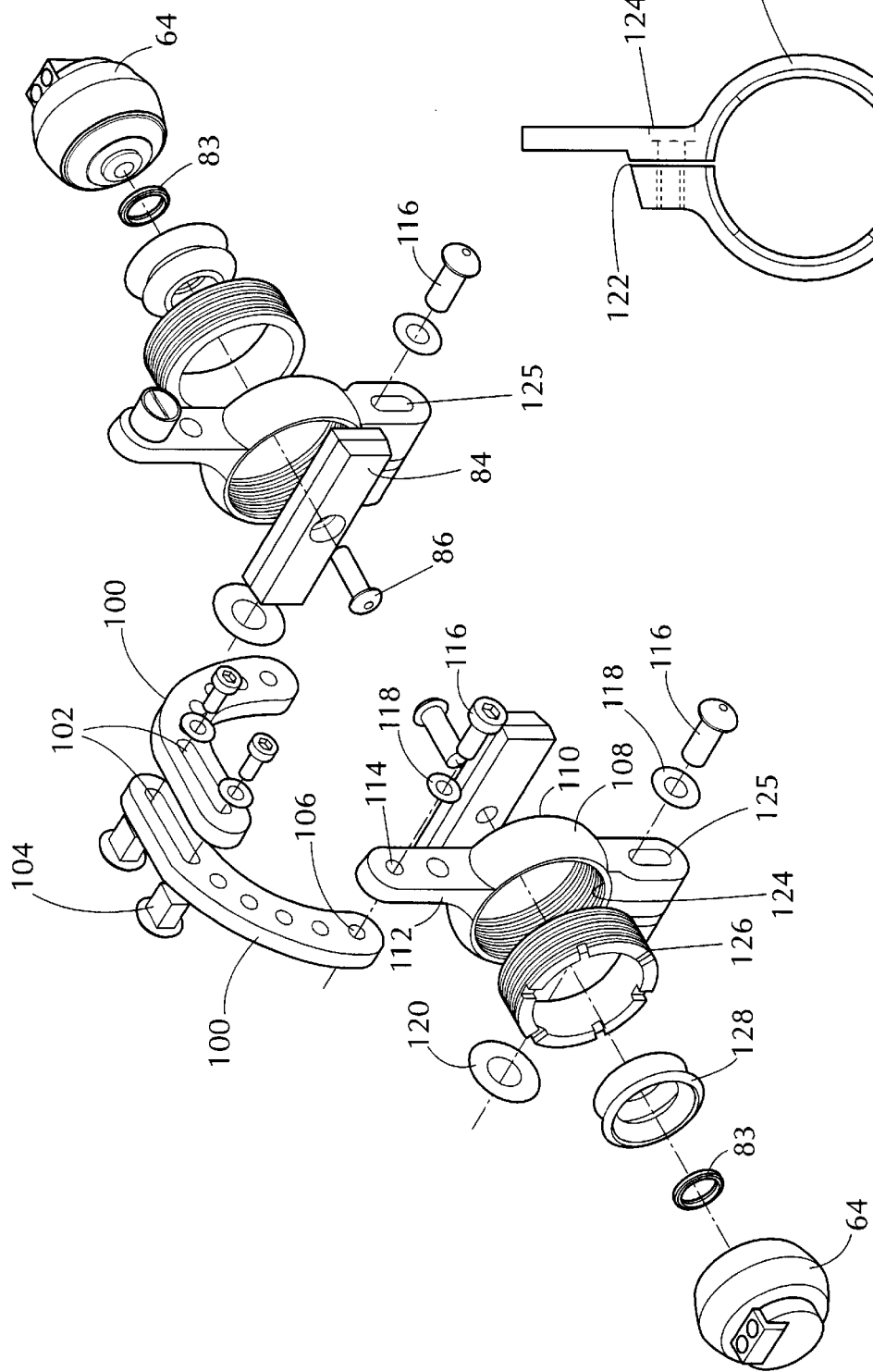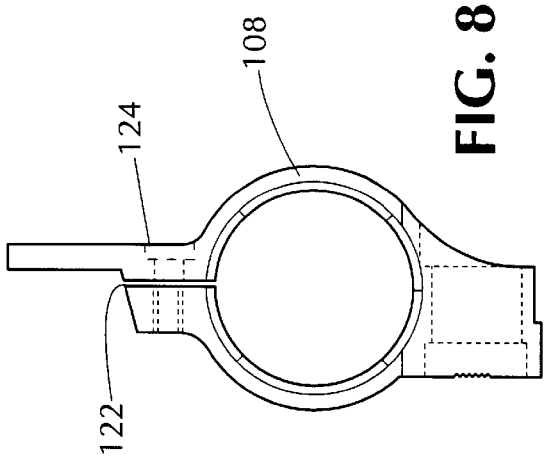

HAND OPERATED HYDRAULIC VEHICLE BRAKE

BACKGROUND OF THE INVENTION

The present invention relates to braking systems and more particularly to braking systems for use on bicycles, tandem bicycles, tricycles, wheel-chairs, and motorcycles or mopeds.

There are many drawbacks inherent in the present generation of both cable and cable actuated hydraulic bicycle brakes or a combination of both.

Best known and universally used among the patented system designs are cable actuated. These mechanical systems have always suffered from cable stretch, difficulty in maintaining proper adjustment and alignment, varying degrees of mechanical energy loss due to friction, short radii during change of direction, or kinks in the actuating cables. The accumulative result is a continuous need to readjust and/or realign the system to compensate for energy losses which significantly reduce performance and rider ability to accurately control the braking modulation needed to operate the bicycle safely under all riding conditions.

A majority of the most popular mechanical cable brakes, known as a cantilever brake, pivot about a stud brazed onto, or suitably attached to the front fork and rear seat stays of a bicycle frame. All of these brakes suffer from the same maintenance, physical alignment and cable stretch problems. They must be continuously re-adjusted to strike the rim in such a manner as to apply the force of the pad perpendicular to, and in line with, the center of the rim sidewall. Pad wear, misalignment, cable stretch, frame flexing and all the variables inherent in cable operated brakes collectively may eventually cause the pads to pass under the rim, known in the industry as "diving", with the result the rider cannot properly stop his bicycle.

Another drawback to the cable actuated brakes is the amount of lever pressure required for moderate to maximum braking or when approaching wheel "lock-up" at any speed. This is especially true for the present generation of suspension forks and rear suspension frames. All known present designs are of an "on-off" design with the only manual force modulation available through "cable stretch" or "frame flexing". With the advent of high speed off-road and downhill descents, the dynamics of the rider induced loads reacted by moving frame and fork components makes it virtually impossible to accurately modulate pad forces, particularly for small hands or those incapable of producing 250–350 pounds of force on the actuating lever. With the advent of straight handlebars on all terrain bikes, coupled with two or three finger lever shapes where the levers must travel in excess of 40° rotation, cable brakes or cable actuated hydraulic brakes are, for the most part, not capable of providing sufficient modulation to the rider under maximum lever force conditions. If the rider elects to install disk brakes the problem is only increased. When all these drawbacks are compounded by the need to brake, shift gears, and steer at the same time, riding under adverse conditions can become quite hazardous; a fact well known to highly experienced riders.

Another brake system presently gaining prominence is the cable actuated hydraulic brake, usually used in disk brake systems where the disk is attached to the hub and the calipers, or actuators are suitably attached to the front fork or frame. These systems have the same cable stretch problems, plus the condition known as "frying" caused by excessive heat transferred from the disk, particularly when the wheel is at rest after a "crash" stop. The systems all use pistons sealed by rubber seals which deteriorate quickly and fail under excessive heat particularly if the hydraulic oil has no communication with the oil in a line or reservoir into which it may transfer a part of its heat.

The best of existing brake systems are the fully hydraulic systems. Unfortunately, it is not possible to completely seal a system and maintain effective transfer of energy with any piston-actuated "wet" system. Those trained in the art know that a seal, be it O-ring, lip-seal, or any other rubber compound seal must slide on a highly polished surface and, preferably, should be located between parts not made of the same material. Any seal in a piston or cylinder must have some provision for lubrication to reduce wear and friction. The problem is that seals work with hydraulic pressure in such a way that the pressure creates the seal, and the result is that the surface must always be moist with lubricant. Also with higher pressure, there is a greater seal requirement resulting in a greatly increased drag, or friction. For these reasons a piston, or automobile type brake, can never be frictionless.

The only "dry", fully hydraulic system presently known uses a hybrid type rolling diaphragm or "bellowfram", as it has been called and described in U.S. Pat. Nos. 4,391,353 and 4,615,415 to Mathauser. In that design the inventor chose to go outside the standard design of rolling diaphragms and increased the height to diameter ratio to 1.36 to 1. The result was that in actual practice it was extremely difficult to seal the diaphragms to the hydraulic head and virtually impossible to do so in factory production, and then only by resorting to manufacturing tolerances and fabrication techniques by well trained personnel that make the system very costly to manufacture. The only corrective maintenance available is "remove and replace" entire assemblies such as the master cylinder and slave cylinders.

Another problem of the Mathauser design is that in practice under heavy usage it has been found that the height to diameter ratio of the bellowfram design impressed excessive strain on the sidewall of the bellowfram and could cause it to prematurely fail at a point in the roll where the high pressure was repeatedly applied. The only way to correct such a failure is to remove and replace whichever cylinder is causing the problem, recharge the system, and replace it on the bicycle.

Still another problem of the Mathauser brake is that once a master cylinder or slave cylinder is completely manufactured and assembled the cylinders have no means for inspection and/or repair.

Still another drawback of the Mathauser design is the shape and dimension of the slave cylinders. With the advent of rear suspension frames, where the "seat stay" is lowered to accommodate rotation, any part of a braking system that extends outside the envelope of the frame is subject to being struck by the foot of the rider and is unacceptable to the bicycle manufacturers.

Another drawback to the Mathauser designs is that only one slave cylinder is used requiring it to cause a pivoting reaction in the bracket area mounting the opposed brake pad. The pivotal mounting mechanism can loosen in use thereby resulting in a loss of braking effectiveness.

SUMMARY OF THE INVENTION

The hydraulic brake of the present invention includes a pair of brake pad units driven by slave cylinders fluidly connected by a flexible fluid line to a hand lever actuated master cylinder. The flexible line is releasably coupled to hydraulic cylinder actuators, which move the brake pad holders or shafts, and a hand lever actuated master cylinder.

The master cylinder control unit housing is suitably cramped around the handlebar in a manner that provides a means for rotation about the bar to a position that properly positions the hand lever control and integrates it with the shifter controls. The hand lever is pivoted in the control housing around a bushing. An extension from the actuating lever actuates a plunger residing in the master cylinder piston which contains a means for changing the force to lever angle curve of the braking force. The master piston transfers its force through a rolling diaphragm to the hydraulic fluid lines and thence to the slave cylinder rolling diaphragms which in turn transfer the force to the pad shaft and brake pads against the braking surface of the wheel rim or disk.

The master cylinders are assembled using a cap section which transfers force through the fluid lines to the slave cylinders. A rolling diaphragm is clamped between the fluid cap and the master cylinder by means of mating threads to clamp and seal the diaphragm bead between the two parts. A piston or shaft is mounted inside the cylinder and nested in the outside, or dry side of the rolling diaphragm. Movement of the control lever rolls the diaphragm, thereby evacuating the fluid from the cap and forcing it into the slave unit cap through the fluid lines. The hydraulic force is imparted, through the movement of the rolling diaphragms, to the slave unit actuator shaft and to the braking pads.

The slave units are assembled in a manner similar to the master cylinder except that incorporated between the pad actuator and the slave cylinder is a fluid return device that causes the fluid to return to the master cylinder when the lever force is reduced.

The slave unit actuator mounts are adjustably mounted between the brazed-on mounting post on the one end to an adjustable arch on the other end. The opposing slave cylinder is mounted in a similar manner on the support arch on the other side of the wheel. In this manner fork, or frame stay rotational flexing is virtually eliminated resulting in a much higher degree of accurate force modulation and preventing misalignment.

The slave units are spherically configured and are mounted inside a spherically shaped adjustable mount which in turn has acme threads on its outer surface. These threads are mated with the mating threads on the interior of the slave actuator mounts. In this manner the slave units may be adjusted toward or away from the rim and spherically within the mount for pad clearance, toe in, rim angle, adjustments and the like. Because the slave unit mounts may be adjusted fore and aft along the frame stays, the slave assembly becomes a unit adjustable in all three planes, and spherically.

In operation the rider applies force to the master cylinder by rotating the control lever toward the handle bar. This rotation imparts a thrust force to the end of the master piston in contact with the rolling diaphragm. The force causes the rolling diaphragm to evacuate hydraulic fluid and transfers the hydraulic pressure thereby created to the rolling diaphragms of the slave units. The slave unit rolling diaphragm transfers force to the slave piston, which transfers the force to the brake pad and forces it against the rim or other braking surface of the wheel.

A benefit of the present invention is that when properly designed, the slave actuator unit does not require specially designed shapes on the piston end to keep the elastomer/fabric diaphragm in place on the end of the piston during force application.

The present invention has an additional benefit in use of a smaller height to diameter ratio to improve the performance of the rolling diaphragm. This is especially evident under higher hydraulic pressures, as the molding of the crisscross diaphragm fabric is proportionately less distorted as the distance between the two sharp corners at the top and bottom of the hat section of the diaphragm decreases.

The harder the brake pad is forced against the rim or other braking surface the more the side load that must be restrained within the slave actuating unit. In the present invention this load is reacted against by the head, or plunger, of the cylinder against the cylinder wall at the diaphragm end and shaft bearing at the other and throughout the mounting subsystem to the posts of the frame or fork.

When the lever force is reduced or released at the master cylinder, a return force from the slave rolling diaphragms is provided by non-symmetrical nesting springs residing between the piston on the one end and the cylinder wall at the other. This imparted force evacuates the rolling diaphragm of the slave units and transfers the hydraulic fluid back into the master cylinder rolling diaphragm, which in turn causes the control lever to rotate away from the handle bar.

The slave units react the force against the pads through the mounting system and the brazed on studs on either the frame or fork. The arch provides restraint against rotational flexing of the frame stays or fork blade members.

The control modulation unit provides the rider a means for a changing rate of force per degree of control lever rotation that is linear to the preloaded amount of the force modulation provision, and non-linear to 80° of the force curve. At that point the force per degree of lever travel again becomes linear until the maximum lever travel is reached. This modulation provides the rider with a non-linear controllable means to shift the bicycle/rider center of weight forward and aft both up to, and during hard, or "crash", stops.

Those trained in the art recognize that the most difficult control of the braking system results from the inability to depart from the "on-off" characteristics of the brake system, in particular at the very highest forces just short of stopping rotation, or "locking up" the braking surface.

OBJECTS OF THE INVENTION

It is an object of the invention to provide a hand operated hydraulic brake system that can be operated by all riders, including those with small hands, weak grips, or physically impaired by the amount of force they can generate between a lever and a handle bar.

It is another object of this invention to provide a simple, easily manufactured hand actuated hydraulic brake system.

It is another object of the invention to provide a hand actuated hydraulic brake system that is light in weight.

It is another object of the invention to provide a hand actuated hydraulic brake system that is economical to manufacture and maintain.

It is another object of the invention to provide a hand actuated hydraulic brake system with a quick release means for opening the brake arch to remove wheels with large diameter tires.

It is another object of the invention to provide a hand actuated hydraulic brake system with a means for installation on a wheel without requiring any re-adjustment to the brake/pad alignment system.

It is another object of the invention to provide a hand actuated hydraulic brake system in which every part is easily inspected, maintained and repaired without special skills or requiring the use of special tools.

It is another object of the invention to provide a hand actuated hydraulic brake system that can be installed or retrofitted to any standard cantilever brake equipped frame design without modification or special additional parts or hardware.

It is another object of the invention to provide a hand actuated hydraulic brake system that requires no reservoir, refilling, or other hydraulic servicing.

It is still a further object of the invention to provide a hand actuated hydraulic brake system that incorporates a relatively frictionless hydraulic operating system.

These, together with other objects and advantages, will become apparent in the details of construction and operation as more fully hereinafter described and claimed, reference being provided in the accompanying drawings which form a part herein wherein like numerals for like parts are used throughout.

BRIEF DESCRIPTION OF THE DRAWINGS

FIG. 2 is a perspective view showing a master cylinder and brake assembly mounted with respect to a bicycle handlebar;

FIG. 3 is a sectional view of the master cylinder and brake lever assembly shown in FIG. 2;

FIG. 7 is an exploded perspective view of the slave cylinder assemblies;

FIG. 8 is a partial view showing an alternative mount construction;

DESCRIPTION OF A PREFERRED EMBODIMENT

Figure 1:
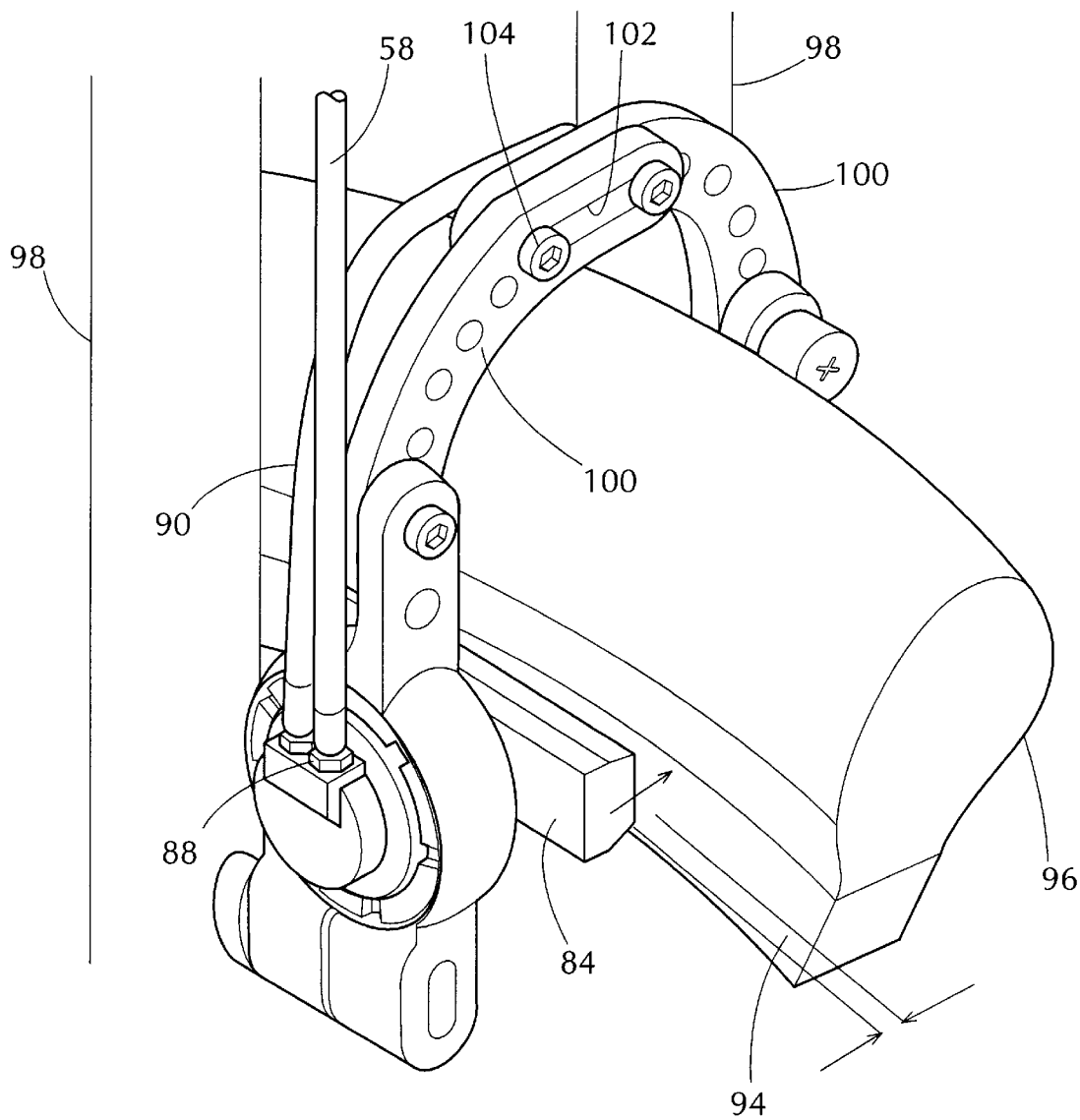
FIG. 1 is a perspective view showing a slave cylinder assembly mounted with respect to a bicycle wheel.

With reference to FIGS. 1, 2 and 3 there is shown a hydraulic brake system for a vehicle such as a bicycle and the like which includes a master cylinder brake assembly 10 mounted in a convenient fashion to a bicycle handlebar 12 by a bolt 13 to tighten band 15. The brake assembly includes a brake actuating lever 14 which is depressible by the user in the normal manner in a direction towards the handlebar 12. As best seen in FIG. 3 lever 14 is pivotally mounted within housing 16 as at 18 and includes an extension arm 20. A threaded through bore 22 is provided in the brake actuator 14 to receive a set screw 24 which is adjustably threaded against a stop 26 to limit the extent of movement of the brake actuator 14.

A pivotally mounted bushing 28 is fixed within actuator extension arm 20 to threadably receive an adjustment screw 30. The end 32 of adjustment screw 30 abuts against a concave receiving surface 34 of a movable piston member 36. Piston 36 is slidably disposed within a bushing 38 which is in turn slidably disposed within a threaded interior cylindrical member 40 which threads within housing 16 as at 42. Bushing 38 is open at one end to accommodate piston 36 and closed at its other end as at 44. A coil spring 46 is disposed between the end of piston 36 and the interior wall of closed end 44. A flexible diaphragm 48 of a reinforced liquid impervious elastomeric fabric is provided to define a hydraulic liquid reservoir 50 within the front housing 52 of the master cylinder assembly 10. The diaphragm 48 is secured within the housing by a suitable seal member such as a bead of the elastomeric material of the diaphragm 54 and is held in place by the threaded engagment of the front housing 52 to housing 16 by threads 56. Hydraulic fluid is directed from the master cylinder assembly 10 by means of a flexible line 58 which is threadably secured at the front of housing 52 as at 60. A fill opening is also provided at 62 in the event additional hydraulic fluid need be added.

In operation as actuating lever 14 is depressed end 32 of piston actuator 30 slides along the concave portion 34 of piston 36 forcing the piston, against the action of spring 46, to cause the flexible diaphragm 48 to move to the left, as viewed in FIG. 3. The diaphragm rolls as it moves forcing the hydraulic fluid in fluid reservoir 50 to flow through flexible line 58 to the slave cylinder assemblies as will be described more fully hereinbelow.

Figure 4:
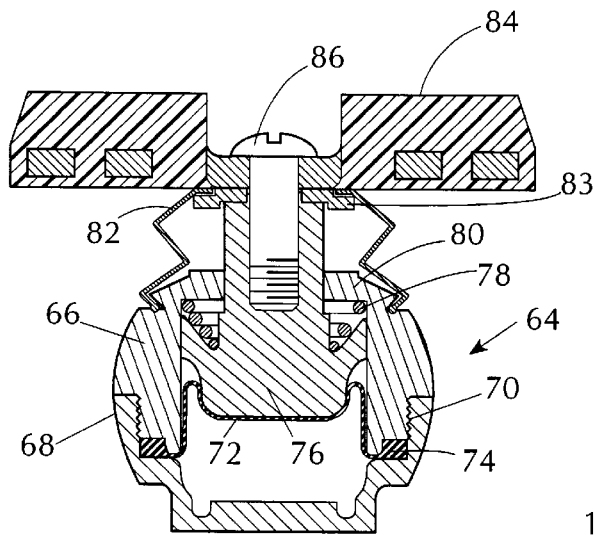
FIG. 4 is a cross-sectional view of a slave cylinder assembly in an extended position.
Figure 5:
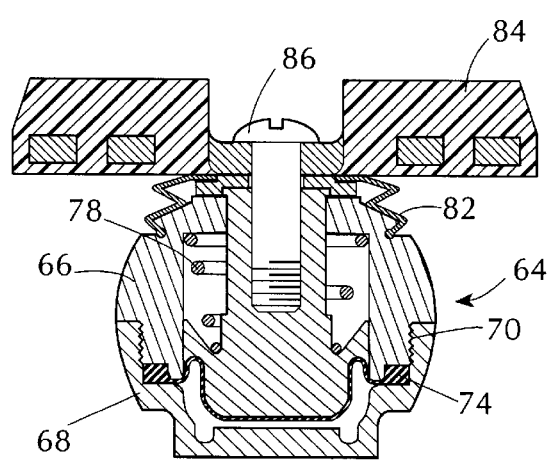
FIG. 5 is a cross-sectional view similar to FIG. 4 showing the slave cylinder assembly in a retracted position.
Figure 6:
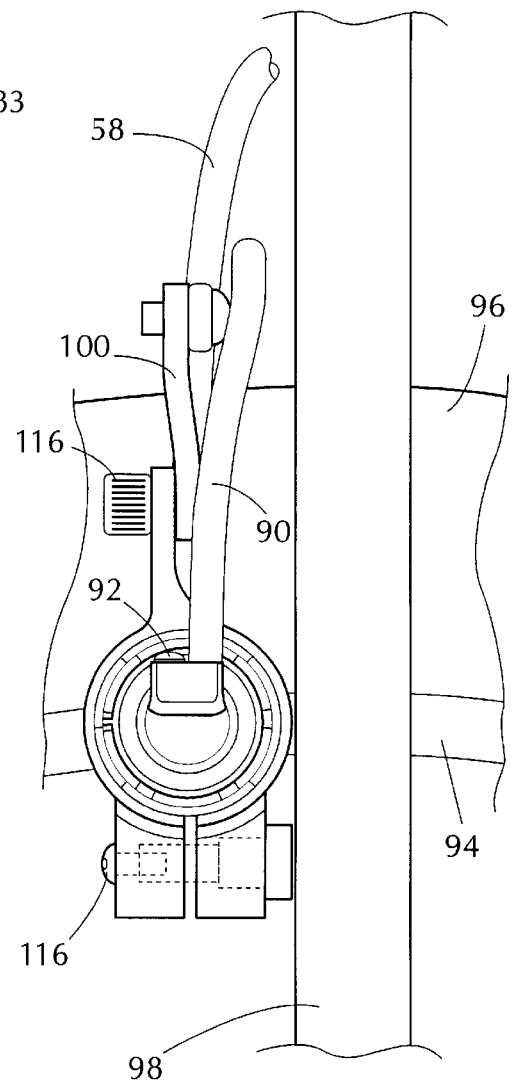
FIG. 6 is an elevational view showing the slave cylinder assembly mounted with respect to a bicycle wheel.

Reference is now made to FIGS. 1 and 4–7 for a description of the manner in which the slave cylinders respond to cause the brake pads to move into a braking position. As noted above, the present invention provides a pair of identical slave cylinder assemblies to actuate the brake pads positioned on each side of the wheel to be braked. Each slave cylinder assembly 64 includes a pair of housing members 66 and 68 which thread together as at 70 to form a unitary housing. The exterior surfaces of housings 66 and 68 are spherically shaped to permit orientation in a wide number of positions as will be explained hereinafter. As best seen in FIGS. 4 and 5 slave cylinder housing 68 when it is threadably engaged secures a reinforced liquid impervious elastomeric fabric membrane 72 disposed within slave cylinder housing 64 by the threaded engagement of the two housing parts and a bead of the elastomeric material of the diaphragm 74 in the same manner as the flexible membrane is installed in the master cylinder assembly.

A piston 76 is also provided for sliding disposition within the slave cylinder housing 64 and movement of the piston is opposed by a non-symmetrical return spring 78 interposed between a cavity in the piston 76 and an end wall 80 of the housing 66. A flexible dust cover 82 secured in a lock washer 83 is provided on the exterior portion of the piston and a brake pad 84 is replaceably fixed to an end of piston 76 by a screw 86. The brake pad is preferably an elastomeric material with a high coefficient of friction with respect to a metallic surface.

Hydraulic line 58 from the master cylinder assembly is releasably connected to one of the slave cylinder assemblies 64 as at 88 and the hydraulic fluid enters housing 64 on the flexible member side of the piston 76. A fluid transfer line 90 is releasably connected as at 92 to the same slave assembly 64 which receives hydraulic line 58 to transfer fluid to the other slave assembly. The second slave cylinder has the second access port sealed by a suitable screw 92.

When the rider actuates lever 14 to initiate movement of the master cylinder the hydraulic fluid within chamber 50 is forced into hydraulic line 58 which in turn directs fluid under pressure to the first slave cylinder and then through hydraulic transfer line 90 to the second slave cylinder to cause both the pistons 76 to move under the action of the rolling diaphragms 72 against springs 78 and move the brake pads 84 against the braking surface 94 of a wheel 96. FIG. 5 illustrates the position of the master cylinder before hydraulic fluid enters and FIG. 4 shows the position of the slave cylinder after hydraulic fluid has been forced into the fluid receiving cavity and after the diaphragm has rolled. When the rider releases actuating lever 14 the return springs 78 force the piston to move rearward causing fluid within the slave cylinders to return to the master cylinder.

The slave cylinder and brake pads are adjustably mounted in an appropriate place on the bicycle frame 98 by a pair of half U-shaped brackets 100. Each bracket includes a slot 102 in the flat leg and are secured together by a lock bolt and washer assembly 104. The elongated slots 102 permit lateral adjustment of the brackets 100 to accommodate varying widths and properly position the brake pads in proximity to the braking surfaces 94. Each bracket 100 includes a through bore 106 in the leg of the bracket through which the slave cylinder assemblies are mounted.

The slave cylinders 64 are secured to the brackets 100 through a split bracket assembly 108 which has a circular segment 110 and extending ear 112 with a through bore 114 to receive a lock bolt 116 through a washer 118 to secure the split bracket 108 to support bracket 100. Bracket 108 may be split at its lower end as at 114 so that it may tighten and close by a lock bolt 116, washer 118 and 120 when the bracket is mounted to the bicycle frame 98. Alternatively, bracket 108, as shown in FIG. 8, may be split at its top, as at 122, and closed and tightened by a lock bolt assembly 124. The lower portion of split bracket assembly 108 is provided with an elongated slot 125. The lock bolt 116 positioned in slot 125 is the attachment means to the frame 98. The slot permits the brackets to be vertically adjustably mounted with respect to the wheel 96.

The interior of the bracket 108 is threaded as at 124 to receive a threaded sleeve 126 which in turn receives a plastic bushing 128 within which is rotatable mounted the slave cylinder housing 64.

Figure 9:
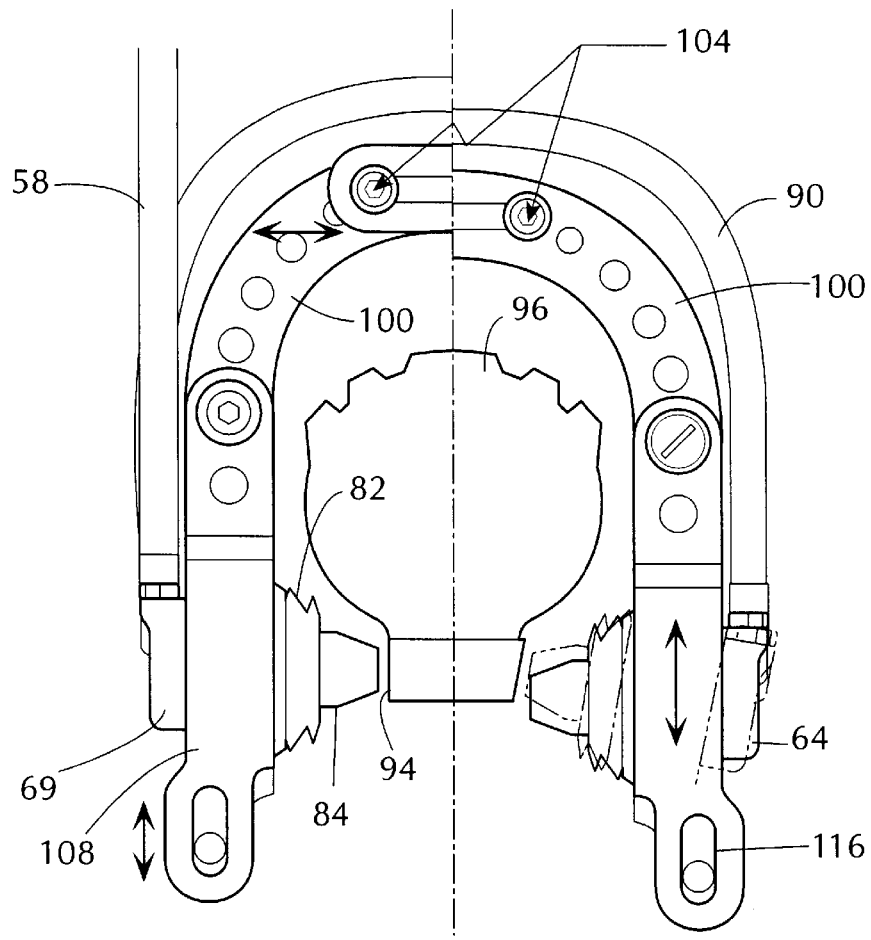
FIG. 9 is an elevational view of the slave cylinder assemblies.
Figure 10:
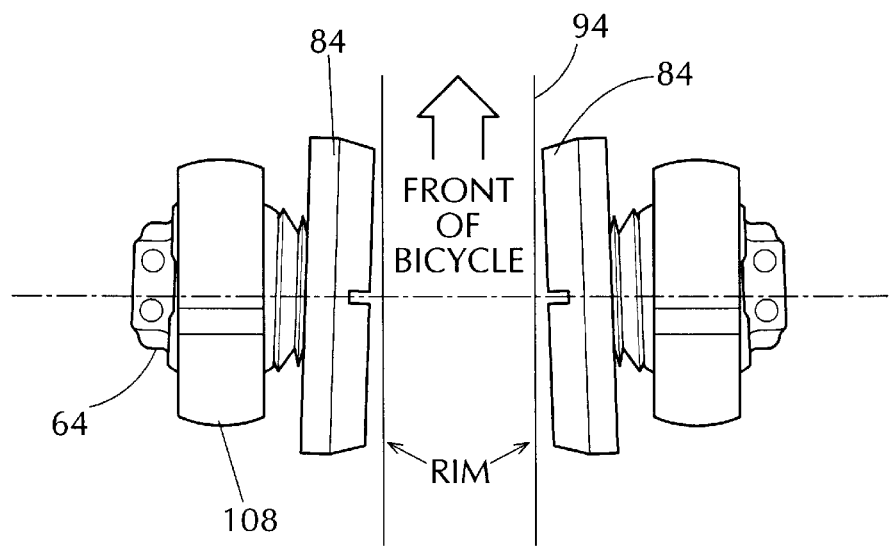
FIG. 10 is a top plan view of the slave cylinder assemblies.

FIGS. 9 and 10 illustrate the manner in which adjustments may be made to properly position the brake pads 84 to accommodate the wide variation in bicycle and wheel configurations. As noted previously, the brackets 100 can be adjusted laterally by proper positioning of lock bolts 104 and can be adjusted vertically as indicated by the arrows by positioning mounting bolts 116 in the receiving slot 125 so that the proper orientation of the brake pads 84 with respect to the braking surface 94 of a wheel is attained. In addition, because of the spherical configuration of the slave cylinders 64 the position of the slave cylinders can be adjusted as indicated in broken line in FIG. 9. The slave cylinders may also be adjusted as shown in FIG. 10 to provide toe-in adjustment of the brake pad which is desirable for most effective braking action. With toe-in orientation of the brake pads 84 slight brake pressure will bring only the forward part of the brake pad into contact with the braking surface to provide a slight braking action while greater actuation of the brake is attained when the brake actuating lever is advanced a further degree.

It is thus seen that the present invention provides a more efficient hydraulically actuated brake system without some of the detrimental aspects of prior art cable brake systems and prior art hydraulic systems. Use of the diaphragm hydraulic brake system permits construction of a brake system which does not inordinately extend outwardly from a bicycle so that the brake system does not interfere with safe and effective operation of the bicycle. In addition, assembly of the system is relatively simple and does not require complex mechanisms and the system lends itself to relatively simple repair should, for example, a fabric membrane need replacement. The cylinders can be easily repaired by draining the hydraulic fluid and disassembly of the cylinder for ease of replacement of any fabric membrane. The mounting system also provides for relative ease of adjustment to properly position the brake pads for the most effective braking effect.

What is claimed is:

1. A hydraulic brake system for a wheeled vehicle comprising:

a master hydraulic cylinder, a brake actuating lever associated with said master cylinder to compress hydraulic fluid within said master cylinder upon actuation of said brake actuating lever, a hydraulic fluid transfer line extending from said master cylinder to a pair of hydraulic slave cylinders positioned on each side of a wheel, each said slave cylinder including brake pads to contact braking surfaces on a wheel of said vehicle, a bracket assembly for mounting on a frame support member of said vehicle to mount said hydraulic slave cylinders, said bracket assembly including a first mounting structure permitting lateral adjustability and a second mounting structure permitting vertical adjustability thereby to position said brake pads adjacent said wheel braking surfaces, and wherein said bracket assembly and each said slave cylinder are configured to permit substantial universal rotational movement of each slave cylinder with respect to said bracket assembly.

2. The hydraulic brake system of claim 1 including a support mount for said hydraulic cylinders mounted on said bracket assembly, said hydraulic cylinders being adjustably positioned in said support mount thereby to permit variable positioning of said brake pads with respect to said wheel braking surfaces.

3. The hydraulic brake system of claim 1 including a support mount for each of said hydraulic slave cylinders mounted on said bracket assembly, said hydraulic slave cylinders having a housing with an exterior surface which is spherical in shape, said support mount including a spherical receiving surface to receive said hydraulic slave cylinders, whereby said hydraulic slave cylinders may be adjustably mounted within said support mounts thereby to position said brake pads adjacent said wheel braking surfaces.

4. The hydraulic brake system of claim 3 wherein each said support mount is a split bracket member having a fastener member therethrough to tighten said split bracket member about said hydraulic slave cylinders to positively fix said slave cylinders within said split bracket member.

5. The hydraulic brake system of claim 1 wherein each said master hydraulic cylinder and slave hydraulic cylinders are rolling diaphram hydraulic cylinders.

6. The hydraulic brake system of claim 5 wherein hydraulic fluid is directed from said master hydraulic cylinder when a brake lever is actuated to one of said hydraulic slave cylinders and hydraulic fluid is directed from said one hydraulic slave cylinder to the other of said hydraulic slave cylinders.

7. The hydraulic brake system of claim 1 wherein said bracket assembly comprises a pair of bracket members, each bracket member provided with a slot therein to receive a connecting fastener, said connecting fasteners being positioned within said slot to accommodate lateral adjustment of said pair of brackets.

8. The hydraulic brake system of claim 1 wherein said bracket assembly includes a longitudinal slot to receive a fastener therein to secure said bracket assembly to said frame support member, said fastener being adjustably positioned in said slot to provide said vertical adjustability.

* * * * *